United States Patent [19]
Maas et al.

[11] Patent Number: 5,450,486
[45] Date of Patent: Sep. 12, 1995

[54] TELECOMMUNICATION SYSTEM AND A LINECARD

[75] Inventors: René Maas, Amsterdam; Piet B. Hesdahl, Blaricum, both of Netherlands

[73] Assignee: U.S. Philips Corporation, New York, N.Y.

[21] Appl. No.: 214,387

[22] Filed: Mar. 14, 1994

[30] Foreign Application Priority Data

Mar. 15, 1993 [EP] European Pat. Off. ............ 93200744

[51] Int. Cl.⁶ ............................................. H04J 3/12
[52] U.S. Cl. ..................................... 379/399; 379/93; 379/94; 370/110.1; 370/94.1; 370/58.1
[58] Field of Search .................... 379/399, 413, 93, 94; 370/110.1, 58.1, 13, 94.1, 58.2, 94.1

[56] References Cited

FOREIGN PATENT DOCUMENTS 8911189 11/1989 WIPO .

OTHER PUBLICATIONS

Data Sheet for Siemens PEB 2085.
"Communication System for the Parliament of Northrhine–Westfalia (Landtag NRW)", H. Friedel et al, Philips TDS Review. vol. 46, No. 1, Mar. 1988 pp. 1–13.
CCITT "Blue Book" vol. III Fascicle III–8, Recommendations I.310.1470, CCITT IXTH Plenary Assembly, Melbourne, 14–25, Nov. 1988.
"Logic Design Principles with Emphasis on Testable Semicustom Circuits" E. J. McCluskey, Chapter 11.3, pp. 505–513.

*Primary Examiner*—James L. Dwyer
*Assistant Examiner*—Jacques M. Saint-Surin
*Attorney, Agent, or Firm*—Michael J. Balconi-Lamica; David Schreiber

[57] ABSTRACT

Telecommunication systems such as PABXs are known which comprise ISDN digital linecards with a number of ISDN basic access interfaces. A telecommunication device is proposed comprising configurable ISDN digital linecards. To this end the linecards are provided with configuration means for independently configuring each ISDN basic access interface with respect to the other ISDN basic access interfaces as to mode setting and phantom power feeding to the transmission line to be coupled to the interface. The modes to be set are ISDN-NT or ISDN-TE mode. It is achieved that the PABX can be set to customer specifications without customer specific linecards having to be manufactured. Accordingly, no high manufacturing change-over costs are involved and no expensive extra documentation sets have to be drawn up, as would have been the case when many customer specific linecards would have to be manufactured.

5 Claims, 4 Drawing Sheets

TELECOMMUNICATION SYSTEM AND A LINECARD

BACKGROUND OF THE INVENTION

The present invention relates to a telecommunication system comprising a linecard with at least one ISDN basic access interface for coupling the telecommunication device to at least one ISDN supported device or to an ISDN network via a four-wire transmission line.

The present invention further relates to a linecard for use in such a telecommunication device.

A telecommunication system of this kind is known from an article "Communication system for the parliament of Northrhine-Westfalia (Landtag NRW)", H. Friedel, J. Wiegand, Philips TDS Review, Vol. 46, No. 1, March 1988, pp. 1-13. In this article an ISDN-compatible (Integrated Services Digital Network) PABX (Private Automatic Branch Exchange) is disclosed with stored-program control and digital switching, which can be used both in analog and digital switching, its capacity ranging from 200-20,000 extensions. The digital communication is based on a procedure recommended by the CCITT, an ISDN Basic Rate Access 2B+D, two B-channels for user information, 2 times 64 kbit/s digital speech and data, and one D-channel for signalling or user data, 16 kbit/s, with a netto rate of 144 kbit/s and a bruto rate of 192 kbit/s, and an ISDN Primary Rate Access 30B+D, with a rate of 2048 kbit/s. Physically, the 2B+D and 30B+D form a single link, i.e. the 2B+D and 30B+D channels are multiplexed, but logically, from a user point of view, these channels are totally independent of each other. The PABX communicates with ISDN telephone sets, PCs etc. via ISDN basic access interfaces at 192 kbit/s (Basic Rate Access), and may communicate at the higher 2048 kbit/s with larger computer systems, with other PABXs, with the public ISDN etc. The PABX may also communicate with other PABXs or the public ISDN at Basic Rate. Communication can be point-to-point or point-to-multipoint, possibly via a LAN (Local Area Network). The PABX may also comprise analog interfaces for communicating with the PSTN or with analog telephone sets via a Terminal Adapter, adapting analog devices to an ISDN interface. The basic access interface has the following OSI-model layer 1 characteristics: four-wire transmission line with phantom power feeding, 192 kbit/s (2B+D, contention resolution, and transmission overhead), point-to-point or multipoint/passive $S_o$-bus, AMI (Alternate Mark Inversion) or ternary line code.

Further details concerning ISDN and ISDN user-network interfaces can be found in the CCITT 'Blue Book', Vol. III-Fascicle III-8, Recommendations I.3-10-I.470, CCITT IXth Plenary Assembly, Melbourne, 14-25 Nov. 1988, issued Geneva 1989, particularly pp. Rec. I.410, pp. 155-156, Rec. I.411, pp. 157-163, Rec. I.412, pp. 163-168, Rec. I.421, pp. 169, I.430, pp. 204-209. In Rec. I.411 reference configurations for ISDN user-network interfaces are given, in terms of TE1 (ISDN Terminal Equipment), TE2 (non-ISDN Terminal Equipment), NT1 (Network Termination 1), NT2 (Network Termination 2), and further so-called S-, T- and U-reference points. NT1, which interfaces to a transmission line is broadly equivalent to layer 1 of the OSI layer model, and NT2, is broadly equivalent to layers 1 to 3 of the OSI model. PABXs, LANs, and terminal controllers are examples of equipment or combinations of equipment that provide NT2 functions.. It will be assumed in the sequel that an NT will include NT2 and NT1, and that TE implies TE1. In Rec. I.430, at pp. 204-205, a reference configuration for phantom power feeding is described for the basic access interface at the S-reference point. In FIG. 20/I.430 at page 205, a four-wire transmission line is shown connected an NT to a TE, at the NT transmitter side power being fed to the transmission line at a phantom power point of a line transformer to which further data to be transmitted is fed, and at the NT receiver side ground being connected to a line transformer for receiving data.

In the International application WO 89/11189 a D-channel ISDN-monitor is described which is capable of providing a plurality of operating modes for monitoring of D-channel operation. For being able to monitor both NTs and TEs, the D-channel monitor is provided with ISDN basic interfaces or S-interfaces of Intel type iATC 29C53AA Digital Loop Controller, which is a 4-wire transceiver/controller that is CCITT I.430 compatible and can function at either loop end, i.e. it can be used in linecard (NT) applications or in voice/data subscriber (TE) applications. In the disclosed D-channel ISDN-monitor such a programmable Digital Loop Controller is used to simulate an NT or a TE, both for monitoring purposes only.

Telecommunication devices such as PABXs usually comprise a number of analog or digital linecards and have to fulfill customer specific demands, i.e. one customer may require a quite different PABX configuration than another customer, because of the fact that differents sets of devices have to be coupled to the PABX. As regards the digital linecards, which usually comprise a number of ISDN basic access interfaces, this might imply that a great many of customer specific linecards would have to designed and manufactured, bringing along high manufacturing change-over costs, expensive and extra documentation to be supplied etc.

SUMMARY OF THE INVENTION

It is an object of the present invention to provide a uniformly applicable telecommunication system with uniform linecards complying with many different customer demands.

To this end the telecommunication system according to the present invention is characterized in that the linecard is provided with configuration means for configuring the at least one ISDN basic access interface so as to operate in an ISDN-NT mode or in an ISDN-TE mode, and for configuring the at least one ISDN basic access interface as regards feeding phantom power to the transmission line, at least in the ISDN-TE mode the at least one ISDN basic access interface being disabled for feeding the phantom power to the transmission line. It is achieved that the telecommunication system can be configured to customer specific demands at any time, i.e. during manufacturing, or later at the customer's premises, or still later when the customer changes its configuration. At choice ISDN basic access interfaces can be configured to be coupled to TE's, to the public ISDN, or to other, similar telecommunication devices. The present invention is based on the insight that for configuring an ISDN basic access interface in a telecommunication system for communication with an arbitrary other ISDN system, it is not always allowable to inject phantom power into the transmission line, while at the same time it has been realized that it could be necessary to change the mode from TE to NT or vice versa.

In an embodiment of the telecommunication system according to the present invention for each configurable ISDN basic access interface the configuration means comprise a switch for switching between a first configuration state in which the ISDN basic access interface is configured in the ISDN-NT mode and phantom power is feeded to the Transmission line, a second configuration state in which the ISDN basic access interface is configured in the ISDN-NT mode and no phantom power is feeded to the transmission line, and a third configuration state in which the ISDN basic access interface is configured in the ISDN-TE mode and no phantom power is feeded to the transmission line. Using a switch achieves that any desired combination of phantom power feeding and mode setting can be set uniquely.

In a further embodiment of the telecommunication system according to the present invention, wherein the switch is controlled by a microcontroller, customer specific settings can be stored in a non-volatile memory comprised in the microcontroller. At system power-on, the customer settings are applied to the switches to configurate the linecards. By applying an erasable non-volatile memory, the customer may modify the setting at any time. In an alternative more rigid embodiment the microcontroller switch control can be replaced by a dedicated logic control, the dedicated logic being coupled to the switches and being programmed to implement the customer settings. Such dedicated logic can be PLA (Programmable Logic Array) being available as a standard catalog part. The PLA can be a field programmable LA, i.e. a "fusable link type" FPLA, or a mask programmable LA, the PLA implementing the desired combinational control circuit. In case the customer desires another setting, the PLA has to be replaced by a differently programmed PLA.

In a still further embodiment of the telecommunication system according to the present invention, a demultiplexer is arranged between the microcontroller and the switches, the demultiplexer demultiplexing configuration control signals provided by the microcontroller. It is achieved that less microcontroller output ports are needed to control an army of basic access interfaces. E.g. in the case of 15 basic access interfaces, each having 4 control inputs, 60 control signals would be needed. By applying a demultiplexer coupled to a number of 2-line-to-4-line decoders to provide the control signals, only 6 microcontroller output ports are required, four of them for providing an address to the demultiplexer, and two for providing the control signals. The decoder is of a latched type, i.e. the decoder latches the control signals provided by the microcontroller. In case of a number of linecards, still further demultiplexing can be done.

In a simple embodiment of a telecommunication system according to the present invention for each configurable ISDN basic access interface the configuration means comprise a first and a second strap for enabling-/disabling feeding phantom power to the transmission line, and for ISDN-NT/TE mode setting respectively. The straps can be set in accordance with the customer's settings.

BRIEF DESCRIPTION OF THE DRAWINGS

The present invention will now be described, by way of example, with reference to the accompanying drawings, wherein FIG. 1 schematically shows a telecommunication system according to the present invention.

Throughout the figures the same reference numerals are used for the same features.

DETAILED DESCRIPTION OF THE PREFERRED EMBODIMENTS

Figure 1:
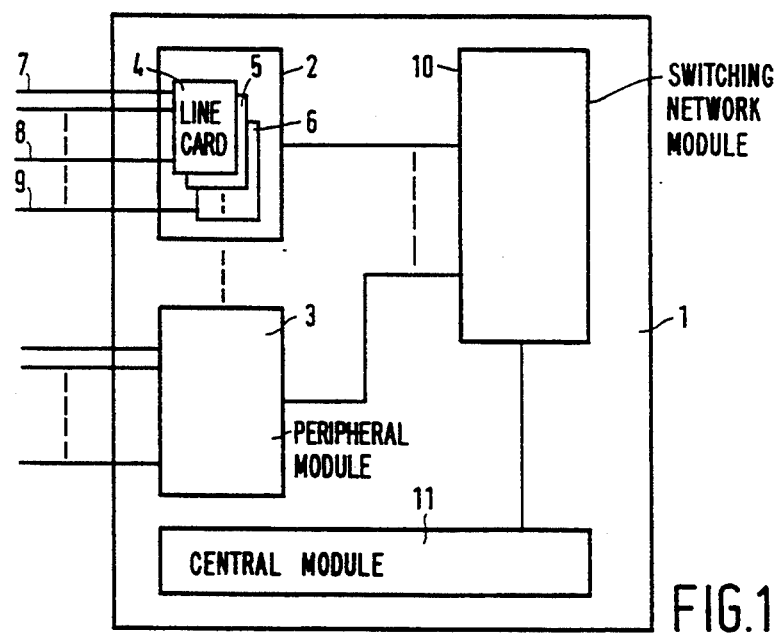

FIG. 1 schematically shows a telecommunication system 1 according to the present invention, e.g. a PABX, comprising a number of Peripheral Modules 2 and 3 for coupling to ISDN supported devices (not shown) such as ISDN digital telephone sets, PCs, telefax devices etc. Also non-ISDN supported deviced can be connected via a so-called Terminal Adapter or Line Adapter Module as disclosed in said Philips TDS Review article, page 7. The Peripheral Modules 2 and 3 comprise digital linecards 4, 5 and 6, to which the ISDN supported devices are coupled via four-wire transmission lines 7, 8, 9. The PABX 1 may also comprise analog linecards for coupling to analog telephone sets or other analog devices. The PABX 1 may be coupled to a public ISDN via a primary rate access interface or via a basic access interface as according to the present invention, and also to a PSTN (Public Switched Telephone Network). The PABX 1 may also be coupled to a LAN (not shown) or to another PABX (not shown). The PABX 1 further comprises a Switching Network Module 10 to which the Peripheral Modules are coupled and a Central Module 11 containing a CPU, communication interfaces, power supply modules etc. as usual. For a more detailed description of the structure of the PABX 1 referred is to articles and service documentation of e.g. the Philips digital business switch or PABX, SOPHO-S 2500 to which also is referred to in the said Philips TDS Review article. The present invention is a modified PABX such a modified Philips SOPHO-S 2500.

Figure 2:
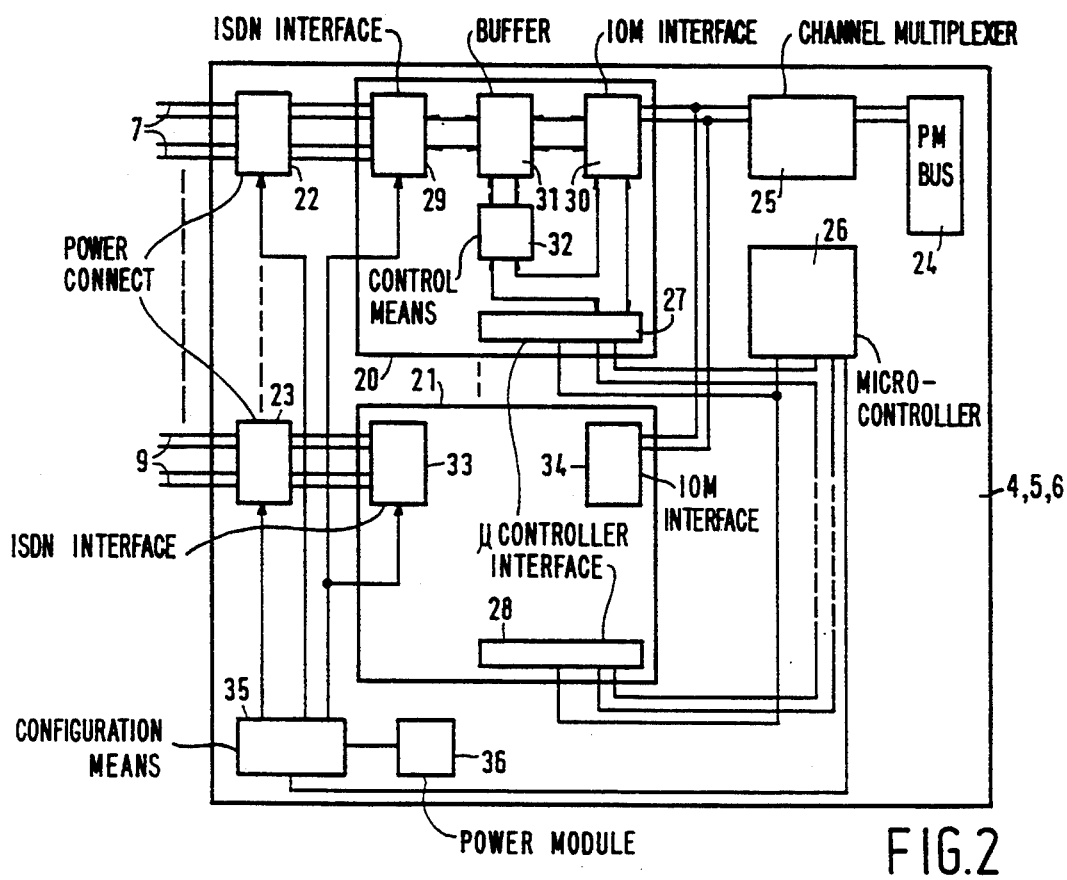
FIG. 2 shows a linecard according to the present invention for use in the telecommunication system according to the present invention.

FIG. 2 shows a linecard 4 according to the present invention for use in the telecommunication system 1 according to the present invention, which comprises a number of ISDN basic access interfaces 20 and 21 coupled to the four-wire transmission lines 7 and 9 power connect and protection circuits 22 and 23 respectively. The ISDN basic access interfaces 20 and 21 are coupled to a PM-bus 24 via a channel multiplexer 25, the PM-bus 24 linking the linecards 4, 5 and 6 to each other, and linking the PMs 2 and 3. All information is supplied from the PMs to the SM 10 via 2 Mbit/s data links, as usual. The ISDN basic access interfaces 20 and 21 are further coupled to a microcontroller 26 via microprocessor interfaces 27 and 28, the microcontroller 26 comprising a microprocessor such as a Motorola 68000-series processor, ROM, RAM, EPROM memory, I/O-interfaces etc., as usual. The ISDN basic access interfaces 20 and 21 can be commercially available Integrated Circuits such as a PEB 2085 ISAC-S type IC implementing a four-wire S/T interface used to link voice/data terminals to an ISDN. The PEB 2085 ISDN Subscriber Access Controller is a full duplex 2B +D interface transceiver according to CCITT I.430 which can be applied in an ISDN-NT (NT2) or in an ISDN-TE (TE1), i.e. at ISDN S- and T-reference points. The ISDN basic access interface 20 comprises an ISDN interface 29 implementing ISDN basic access layer-1 functions, which is coupled to a so-called IOM interface 30 via a buffer 31, the IOM interface 30 being coupled to the multiplexer 25. The interface 20 further comprises control means 32. Correspondingly, the interface 21 comprises an ISDN interface 33 and an IOM interface 34. For further details of the ISDN basic access interfaces 20 and 21 referred is to the relevant Siemens IC specs. According to the present invention the linecard 4 comprises configuration means 35 for configuring the ISDN basic access interfaces 20 and 21 so as to operate in an ISDN-NT or in an ISDN-TE mode, and for configuring the ISDN basic access interfaces as regards feeding phantom power to the transmission lines 7 and 9. The configuration means 35 are coupled to the microcontroller 26 and to a power module 36.

Figure 3:
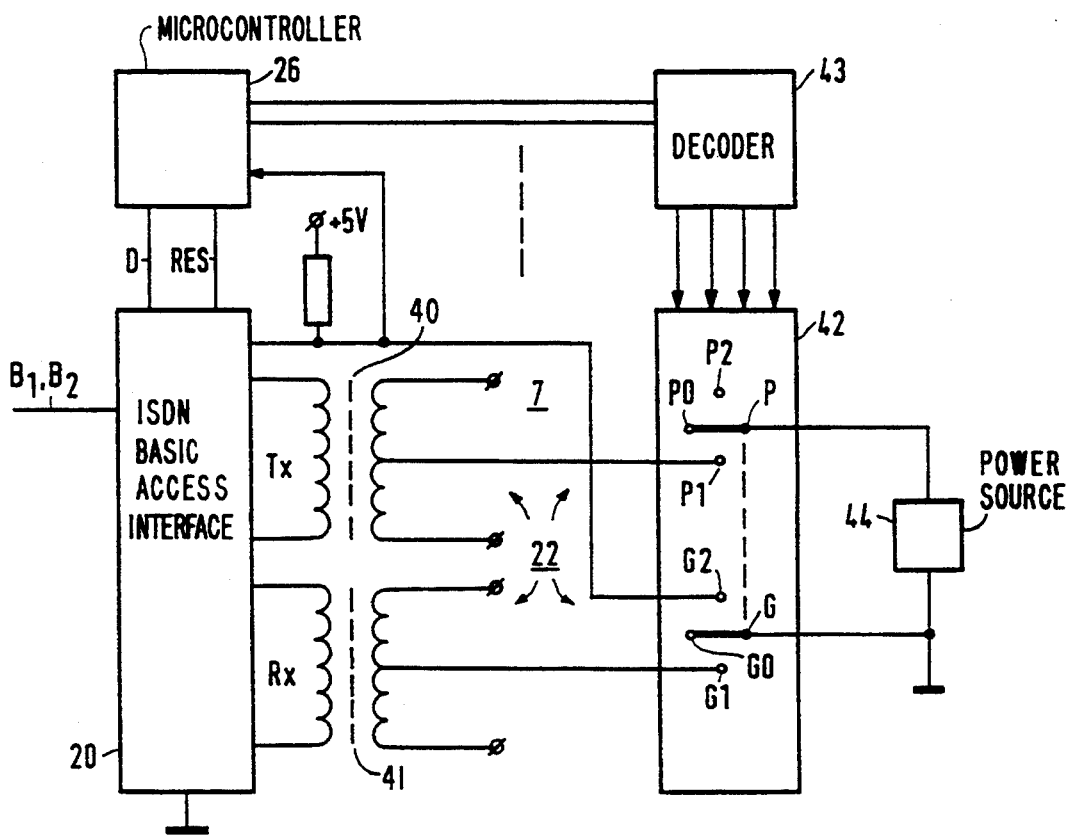
FIG. 3 shows phantom power feeding and mode setting of an ISDN basic access interface in an embodiment of the present invention.

FIG. 3 shows phantom power feeding and mode setting of an ISDN basic access interface 20, 22, in an embodiment of the present invention, comprising a line transformer 40 primarily coupled to a transmit side Tx of the ISDN basic access interface 20, and a line transformer 41 primarily coupled to a receive side Rx of the interface 20. It is further indicated with $B_1$, $B_2$ and D that the interface 20 physically combines and splits the ISDN 2B+D channels. At a signal RES the microcontroller effects mode setting of the interface 20. At secondary sides the line transformers 40 and 41 are coupled to the four-wire transmission line 7. Furthermore a switch 42 is provided coupled to I/O ports of the microcontroller 26 via a 2-to-4-line decoder 43, the microcontroller 26 controlling the switch 42 in accordance with a customer setting in a customer settings table stored in the microcontroller 26. A power source 44 is coupled to the switch 42 for supplying power thereto. The power source 44 supplies a voltage −40 volts at a phantom power point P and is grounded at G. For mode setting a pull-up resistor to +5 volts is provided, supplying a logic "1" to the interface 20, when open at the other side and supplying a logic "0" to the interface 20, when grounded. The interface 20 is in an ISDN-NT mode if a mode signal logic "1" is supplied thereto, and in an ISDN-TE mode if a mode signal logic "0" is supplied thereto. In a first configuration state the switch 42 is positioned by the microcontroller 26 in the position P-P1, G-G1, in which the ISDN basic access interface 20 is configured in the ISDN-NT mode and phantom power is fed to the transmission line 7. In a second configuration state the switch 42 is positioned by the microcontroller 26 in the position P-P0, G-GO, in which the ISDN basic access interface 20 is configured in the ISDN-NT mode and no phantom power is fed to the Transmission line 7. In a third configuration state the switch 42 is positioned by the microcontroller 26 in the position P-P2, G-G2, in which the ISDN basic access interface 20 is configured in the ISDN-TE mode and no phantom power is feeded to the transmission line 7.

Figure 4:
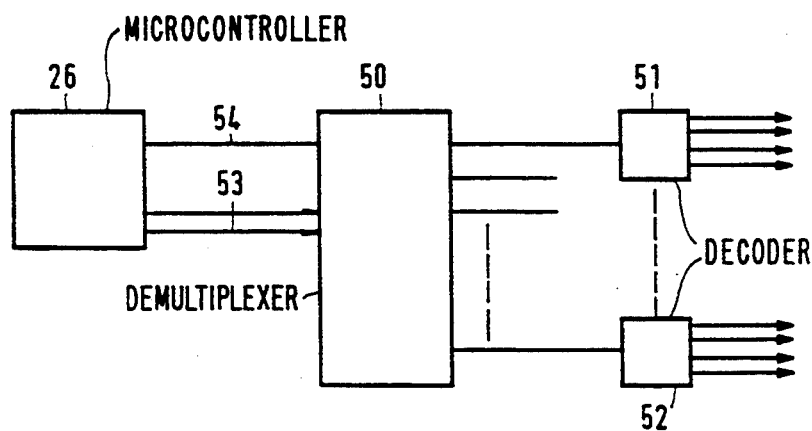
FIG. 4 shows a detail of another embodiment of the present invention.

FIG. 4 shows a detail of another embodiment of the present invention. For saving microcontroller I/O ports, a demultiplexer 50 is arranged between a number of 2-to-4-line decoders 51 and 52 for controlling an array of ISDN basic access interfaces 20 and 21. In an example the array, physically being located on one linecard, consists of fifteen ISDN basic access interfaces. The demultiplexer 50, having four address lines 53 and two control lines 54, is controlled by the microcontroller 26. Such a demultiplexer is disclosed in handbooks with respect to Digital Circuits, such as the handbook, "Logic Design Principles: with Emphasis on Testable Semicustom Circuits", E. J. McCluskey, Chapter 11.3 "Demultiplexing and Multiplexing", pp. 505–513.

Figure 5:
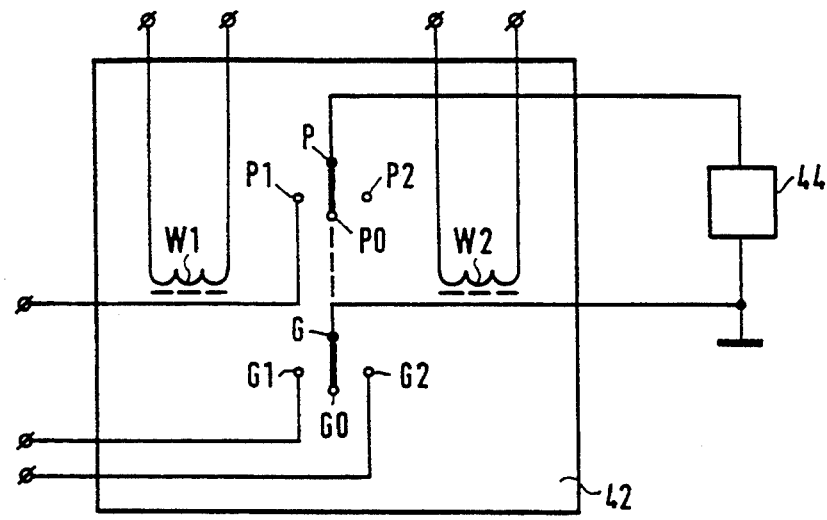
FIG. 5 shows an embodiment of a switch for configuring the ISDN basic access interface.

FIG. 5 shows an embodiment of the switch 42 for configuring the ISDN basic access interface 20, the switch 42 being a three-pole dual change-over electromagnetic switch comprising two excitation windings W1 and W2. Excitation of the winding W1 positions the switch 42 into said first configuration state P-P1, G-G1, neither excitation of the winding W1 nor excitation of the winding W2 positions the switch 42 into said second configuration state P-P0, G-G0, and excitation of the winding W2 positions the switch 42 into said third configuration state P-P2, G-G2. The switch 42 is of a type that has a mechanical rest or mid-position P-P0, G-GO when neither winding is excited, i.e. the telecommunication device 1 starts with a no-phantom power situation at start-up, which is a safe situation.

Figure 6:
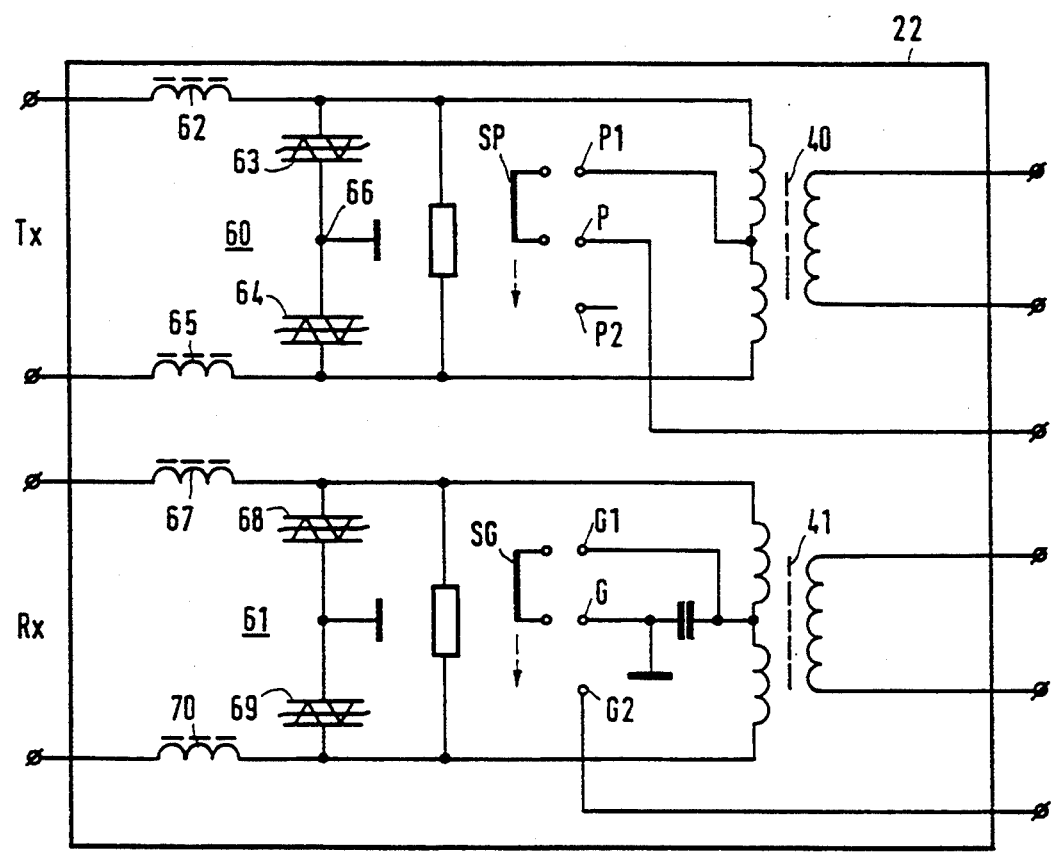
FIG. 6 shows a simple embodiment of the present invention.

FIG. 6 shows a simple embodiment of the present invention, the switch 42 having been omitted. Shown is the power connect and protection circuit 22 and removably attachable straps SP and SG, which are positioned at respective transmit and receive sides Tx and Rx of the linecard 4. The various configuration straps which can be placed in the factory according to the customer's specifications, can easily be repositioned, placed or removed at the customer's premises. Said first configuration state is obtained by placing the straps SP and SG at the positions P-P 1, G-G 1, said second configuration state is obtained by removing the straps SP and SG, and said third configuration state is obtained by placing the straps SP and SG at the positions P-P2, G-G2. The power connect and protection circuit 22 further comprises protection circuits 60 and 61 at transmit and receive side, comprising a series arrangement of a choke 62, a first diode protection arrangement 63, a second diode protection arrangement 64, and a choke 65 coupled in a parallel arrangement with the two-wire transmit transmission line Tx, the protection arrangements 63 and 64 being grounded at their connection point 66, and a similar series arrangement of a choke 67, a diode protection arrangement 68, a diode protection arrangement 69, and a choke 70 in parallel with the two-wire receive transmission line Rx.

Figure 7:
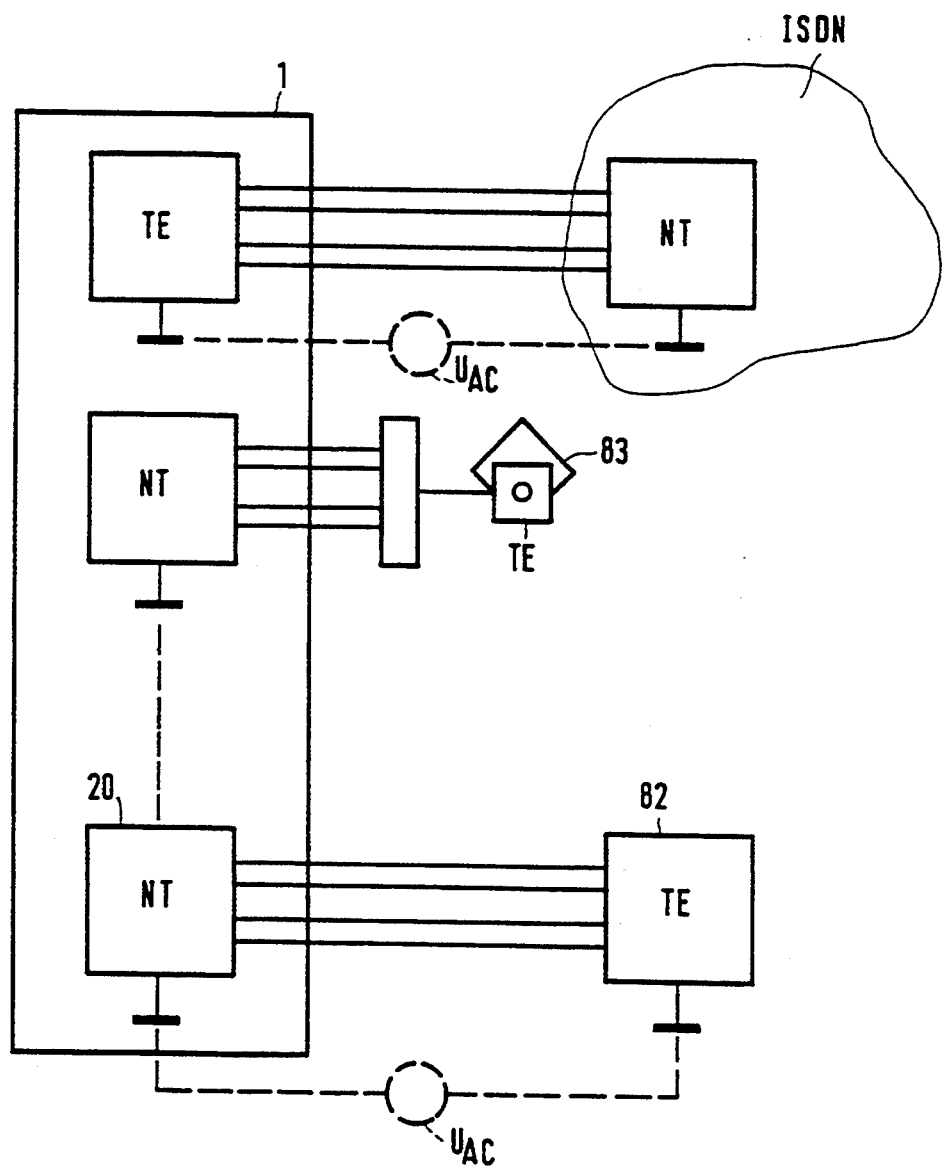
FIG. 7 shows coupling of various devices to a telecommunication system of the present invention.

FIG. 7 shows coupling of various devices to a telecommunication system of the present invention. Shown is the telecommunication system 1, and for simplicity only ISDN basic access interfaces are shown, which are part of the linecard 4. When another PABX 82 or an ISDN is connected to the interface 20, indicated with $U_{Ac}$, relatively high equalization currents could flow. Such equalization currents which would flow through the line transformers at the side of the PABX 1 could lead to a defective linecard, or at least to saturation effects in the linetransformers. Undefined voltages at inputs could also lead to defective inputs. In this situation phantom power feeding to the transmission line is disabled, whereas the ISDN basic access interface is set in the ISDN-TE mode if the ISDN is connected to the interface and is set to the ISDN-NT mode if the PABX 82 is connected to the interface. If a device like an ISDN telephone 82 is connected to the ISDN basic access interface, the, microcontroller 26 controls the switch 42, shown in FIG. 4, to feed phantom power to the transmission line 7, and sets the interface 20 to ISDN-NT mode.

What is claimed is:

1. In a telecommunication device, a linecard for coupling the telecommunication device to one of an ISDN supported device and an ISDN network via a four-wire transmission line, the linecard comprising:
   an ISDN basic access interface;
   configuration means for configuring the ISDN basic access interface to operate in one of an ISDN-NT mode and an ISDN-TE mode and for configuring the ISDN basic inteface for disabling feeding phantom power to the transmission line.

2. A linecard as claimed in claim 1, wherein the configuration means includes switching means for switching between one of a first configuration state in which the ISDN basic acess interface is configured in the ISDN-NT mode and phantom power is fed to the transmission line, a second configuration state in which the ISDN basic access interface is configured in the ISDN-NT mode and no phantom power is fed to the transmission line and a third configuration state in which the ISDN basic access interface is configured in the ISDN-TE mode and no phantom power is fed to the transmission line.

3. The linecard according to claim 2, further including a microcontroller for transmitting configuration control signals to the switching means.

4. The linecard according to claim 3, further including a demultiplexer interposed between the microcontroller and the switching means for demultiplexing the configuration control signals.

5. The linecard according to claim 1, wherein the configuration means includes a first strap and a second strap for one of enabling and disabling feeding phantom power to the transmission line and for selecting one of the ISDN-NT mode and the ISDN-TE mode.

* * * * *